(12) United States Patent
DR Winkler et al.

(10) Patent No.: US 12,731,610 B2
(45) Date of Patent: Sep. 8, 2026

(54) PHASE-MODULATED OPTICAL DATA STORAGE

(71) Applicant: Microsoft Technology Licensing, LLC, Redmond, WA (US)

(72) Inventors: Thomas Torsten DR Winkler, Cambridge (GB); Rokas Drevinskas, Cambridge (GB); Ariel Gomez Diaz, Cambridge (GB); Charles Ernest Whittaker, Cambridge (GB); Timothy John Deegan, Cambridge (GB); James Hilton Clegg, Cambridge (GB); Daniel Jonathan Finchley Cletheroe, Cambridge (GB); Hugh David Paul Williams, Cambridge (GB); Austin Nicholas Donnelly, Cambridge (GB); Richard John Black, Cambridge (GB); Masaaki Sakakura, Cambridge (GB); Teodora Ilieva, Cambridge (GB); Bridgette Rosanna Doris Cooper, London (GB); Ioan Alexandru Stefanovici, Cambridge (GB); Erika Blancada Aranas, London (GB); Pablo Rafael Andreas Wilke Berenguer, Berlin (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/958,980

(22) Filed: Nov. 25, 2024

(65) Prior Publication Data

US 2025/0087240 A1 Mar. 13, 2025

Related U.S. Application Data

(63) Continuation of application No. 18/194,113, filed on Mar. 31, 2023, now Pat. No. 12,165,682.

(51) Int. Cl.
*G11B 7/005* (2006.01)
*G11B 7/00* (2006.01)
(Continued)

(52) U.S. Cl.
CPC ............ *G11B 7/0051* (2013.01); *G11B 7/126* (2013.01); *G11B 2007/0013* (2013.01); *G11B 2007/25301* (2013.01)

(58) Field of Classification Search
CPC . G11B 7/127; G11B 7/24044; G11B 7/00456; G11B 7/1353; G11B 2007/0009
See application file for complete search history.

(56) References Cited

U.S. PATENT DOCUMENTS 10,181,336 B1 * 1/2019 Georgiou ............. G11B 7/0065
10,236,027 B1 * 3/2019 Georgiou .......... G11B 11/10532
(Continued)

*Primary Examiner* — Andrew Sasinowski
(74) *Attorney, Agent, or Firm* — Alleman Hall LLP

(57) ABSTRACT

A method of writing data to a transparent substrate comprises forming a first voxel by focusing a first laser pulse on a first location in a transparent substrate; and forming a second voxel by focusing a second laser pulse on a second location in the transparent substrate. The first laser pulse and the second laser pulse have different amplitudes, resulting in the first and second voxels having different strengths. Also provided are a system useful for implementing the method; an optical data storage medium obtainable by the method; and a method of reading data from the optical data storage medium.

20 Claims, 6 Drawing Sheets

(51) Int. Cl.
*G11B 7/126* (2012.01)
*G11B 7/253* (2013.01)

(56) References Cited

U.S. PATENT DOCUMENTS

| | | | | |
|---|---|---|---|---|
| 10,672,428 | B1 * | 6/2020 | Black | G11B 7/0045 |
| 2009/0067313 | A1 * | 3/2009 | Shiono | B82Y 10/00 |
| 2015/0277551 | A1 * | 10/2015 | Travis | G02F 1/133615<br>359/15 |
| 2024/0331731 | A1 | 10/2024 | Sakakura | |
| 2024/0331732 | A1 | 10/2024 | Sakakura | |

* cited by examiner

PHASE-MODULATED OPTICAL DATA STORAGE

CROSS REFERENCE TO RELATED APPLICATIONS

This application is a continuation of U.S. patent application Ser. No. 18/194,113, filed Mar. 31, 2023, the entirety of which is hereby incorporated herein by reference for all purposes.

BACKGROUND

There is substantial demand for data storage. It is estimated that cloud storage providers will in the near future need data storage capacities of the order of zettabytes, a zettabyte being one trillion gigabytes ($10^{21}$ bytes). Much of the data will need to be stored for extended periods of time.

Examples of data storage technologies currently in widespread use include hard disk drives, magnetic tape, flash memory, and optical discs. All of these technologies have drawbacks which require data to be periodically copied onto replacement media. This is costly in terms of both energy usage and hardware requirements.

Magnetic storage media such as hard drives and magnetic tape suffer from gradual demagnetization. Flash memory is subject to read disturb effects, where repeatedly reading from a particular flash cell causes failure of surrounding flash cells. The reflective materials used for data storage in optical media such as DVDs degrade over time.

Birefringent optical data storage media have been proposed as a solution to these drawbacks. A birefringent optical data storage medium comprises a substrate, such as a quartz glass substrate. Data are encoded in 3-dimensional nanostructures formed in the substrate. These nanostructures are referred to as voxels.

A voxel has optical properties which differ from those of the surrounding bulk substrate. Birefringent voxels display different refractive indices depending upon the polarization and/or direction of incident light. The birefringence may be controlled when writing the voxels to the substrate, and is used to encode data.

The substrate is transparent, in the sense of being transparent to light at the wavelength(s) used to read and write the voxels.

Birefringent optical data storage media and their manufacture have been described by e.g. Anderson et al, Glass: A New Media for a New Era? 10th USENIX Workshop on Hot Topics in Storage and File Systems (HotStorage 18), 2018; and in U.S. Pat. No. 10,236,027 B1.

SUMMARY

In one aspect, there is provided a method of writing data to a transparent substrate. The method comprises forming a first voxel having a first strength by focusing a first laser pulse on a first location in a transparent substrate the first laser pulse having a first amplitude; and forming a second voxel having a second strength different from the first strength by focusing a second laser pulse on a second location in the transparent substrate, the second laser pulse having a second amplitude different from the first amplitude. Encoding data by amplitude modulation may allow the voxels to be written using a single laser pulse, thereby increasing data throughput. Alternatively or additionally, the method may allow voxels to be formed reliably in inexpensive substrates such as borosilicate glass.

In another aspect, there is provided an optical data storage medium. The optical data storage medium comprises a transparent substrate comprising a material having a bulk refractive index; a first voxel embedded in the transparent substrate, the first voxel having a first strength; and a second voxel embedded in the transparent substrate, the second voxel having a second strength different from the first strength resulting in the first and second voxels encoding different data symbols. The transparent substrate may be obtainable by a method as described herein.

Still another aspect provides a system for writing phase voxels to a transparent substrate. The system is useful for implementing a method as described herein. The system comprises: a controller; a pulsed laser source; and a first amplitude modulator arranged downstream of the pulsed laser source on a light path. The amplitude modulator is operably linked to the controller. The controller is configured to cause the system to perform a method as provided herein.

A further aspect provides a method of reading data from an optical data storage medium as defined herein. The method comprises capturing an image of the voxels using a refractive-index-sensitive microscope; and processing the image using a processor to recover the data. Portions of the image having different signal intensities encode different data symbols.

Also provided herein is the use of amplitude modulation to encode a plurality of different data symbols as voxels in a transparent substrate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION

Figure 1:
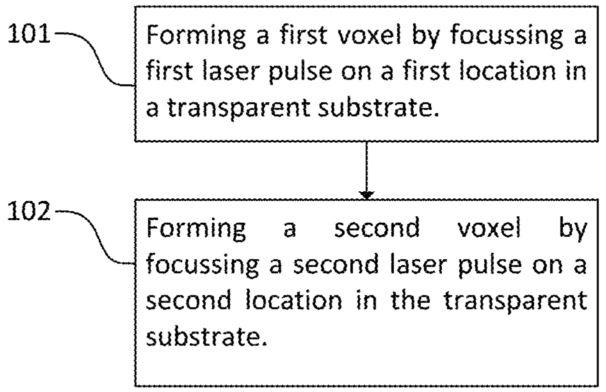
FIG. 1 is a flow diagram outlining an example method of writing data to a transparent substrate.

Directional terms such as "top", "bottom", "left", "right", "above", "below", "horizontal" and "vertical" are used herein for convenience of description, and refer to the orientation shown in the relevant drawing. For the avoidance of any doubt, this terminology is not intended to limit orientation in an external frame of reference.

Ordinal numerals ("first", "second", "third" etc.) are used herein as labels to distinguish between different elements. For example, the recitation of forming a "first" voxel encompasses forming one or more identical voxels.

As used herein, the "strength" of a voxel is the magnitude of the phase change which occurs when light of predetermined wavelength(s) passes through the voxel. The predetermined wavelength(s) is/are the wavelength(s) of the light to be used to read the voxel. The magnitude of the phase change is a function of the refractive index of the voxel and the path length of light through the voxel, the latter being determined by the thickness of the voxel.

Two voxels are considered to have "different" strengths when the voxels cause phase changes which are sufficiently different to be useful to encode different data symbols.

A difference is above the noise floor of the writing system, such that random fluctuations (e.g., in laser power output) do not cause incorrect symbols to be written to the substrate. A difference is also large enough to be resolved by a phase-sensitive microscope. De minimis fluctuations in strength due to random noise are not considered to be "differences" in the context of the present application.

As will become apparent from the discussion below, the magnitude of the differences in strength is controllable by varying the amplitude of the laser pulses used to form the voxels. The difference may be selected as appropriate based on the characteristics of the writing system and the read system. By way of illustration, a pair of voxels of equal size having refractive indices which differ by at least $10^{-4}$ may be regarded as having different strengths. Future developments to writing systems and read systems may allow this limit to be reduced.

Birefringent optical data storage allows for the long-term archival of large amounts of data. Nevertheless, birefringent voxels have some limitations. Forming a birefringent voxel requires at least two laser pulses which limits data throughput (in other words, the rate at which data can be written). A high purity glass substrate such as fused silica is generally required to allow birefringent voxels to be formed reliably.

Further, recovering data from birefringent voxels requires the capture of multiple images (in many implementations, 3 to 5 images) using a polarization-sensitive microscope with illumination using light of different polarizations.

Provided herein is a method writing data to a transparent substrate which may allow a data symbol to be written using a single laser pulse, and/or which may allow for the use of a wider range of substrate materials. In accordance with the method, data symbols are encoded by amplitude modulation, as opposed to the orientation of a birefringent voxel.

Related aspects provide an optical data storage medium obtainable by the method; a system useful for implementing the method; and a method of reading data from the optical data storage medium.

An example method of writing data to a transparent substrate will now be explained with reference to FIG. 1. FIG. 1 is a flow diagram outlining the method.

At block 101, a first voxel is formed by focusing a first laser pulse on a first location in a transparent substrate.

Focusing the laser on the first location causes a permanent change to the structure of the substrate material at the first location. Interaction of a laser with a transparent material may cause a variety of structural changes. Examples include the formation of a densified area, the formation of a rarefied area, a local glass-matrix change, crystallization, amorphization, or the formation of a nanoscopic void. The nature of the change may vary depending upon the laser parameters (e.g., energy, wavelength, pulse duration) and nature of the transparent substrate material.

The change to the structure of the material modifies the refractive index of the material at the first location with respect to the refractive index of unmodified bulk material. The modified region at the first location is referred to as a voxel. The voxel may more specifically be referred to as a "phase voxel", since electromagnetic waves (i.e., light) passing through the voxel undergo a change in phase. The amount of phase shift caused by a phase voxel may be referred to as its strength.

In many materials, the laser causes a modification to the structure of the material which is inhomogeneous in the direction of propagation of the laser. An inhomogeneous modification comprises a region of increased refractive index and a region of decreased refractive index. The regions may be referred to as "sublayers".

Perpendicular to the direction of propagation of the laser, the change to the refractive index follows a radial profile corresponding to the profile of the laser beam. For example, the refractive index modification may have a Gaussian radial profile.

The first laser pulse may be a single laser pulse. Forming each voxel using a single laser pulse may allow voxels to be written at a rate approaching the repeat rate of the laser source used to write the voxels. In principle, two or more laser pulses may be used. For example, writing voxels using a GHz burst laser may allow for improved voxel quality.

After forming the first voxel, a second voxel is formed at block 102.

The second voxel is formed at a second location in the transparent substrate using a second laser pulse.

The second location is different from the first location. The point on which the laser is focused may be varied by moving the transparent substrate relative to the laser and/or by adjusting the focusing position of the laser.

The extent of modification of the structure of the transparent substrate depends upon the intensity of the laser pulse. Intensity may also be referred to as fluence, energy, amplitude, or peak power. Thus, the strength of a phase voxel may be controlled by modulating the energy of the laser pulse.

Voxels formed using laser pulses of different energies may have different refractive indices and/or different thicknesses, the thickness being the size of the voxel in the direction of propagation of the laser pulse.

Phase voxels of different strengths may encode different data symbols. A further data symbol may be represented by the absence of a voxel from a location. By writing phase voxels having two or more different strengths, a multi-bit encoding may be made possible. This may allow data to be stored at a higher density per unit volume.

Various modifications may be made to the described method.

The example refers to formation of voxels of two different strengths. Increasing the number of discrete voxel strength levels may allow higher density storage of data, provided that the reader used to recover the data is capable of resolving voxels of different strengths. For example, writing voxels of 3 to 5 different strengths, or even more, is contemplated.

As explained above, the shape of the voxels follows the profile of the laser beam used to write the voxels. The method may include modulating beam shape. This may allow for a higher bit encoding scheme, thereby increasing data density. For example, the method may include writing two voxels having equal strengths but different shapes (e.g., circular and elliptical). Shape variation may alternatively be achieved using multiple laser pulses. Shape modulation may allow birefringent voxels to be obtained.

In the example, the strength of the voxels is modulated by varying the intensity of the laser pulses. The laser wavelength and laser pulse duration are kept constant. In principle, the strength of the voxels could instead be modulated by varying the laser wavelength or pulse duration. However, since a pulsed source typically operates at a fixed wavelength and fixed repeat rate, more complex hardware may be needed to implement modulation of wavelength or pulse duration.

The method may be parallelized, with two or more instances of the method being performed in parallel. For example, a source laser pulse may be split using a beam splitter, and the split pulses may be used to write respective voxels simultaneously.

Parallelization may allow for improved data recovery, by creating correlations in intensity between voxels written using the same source laser pulse. The energy output of a laser may vary over time, causing variations in the strength of the written voxels. Voxels which are written simultaneously using the same source laser pulse may be subject to equal noise (in particular, equal noise originating from variations in output from the laser source). Correlations between different voxels may be used during image processing/decoding (e.g., with a machine learning model) to compensate for noise introduced at write time.

Figure 2:
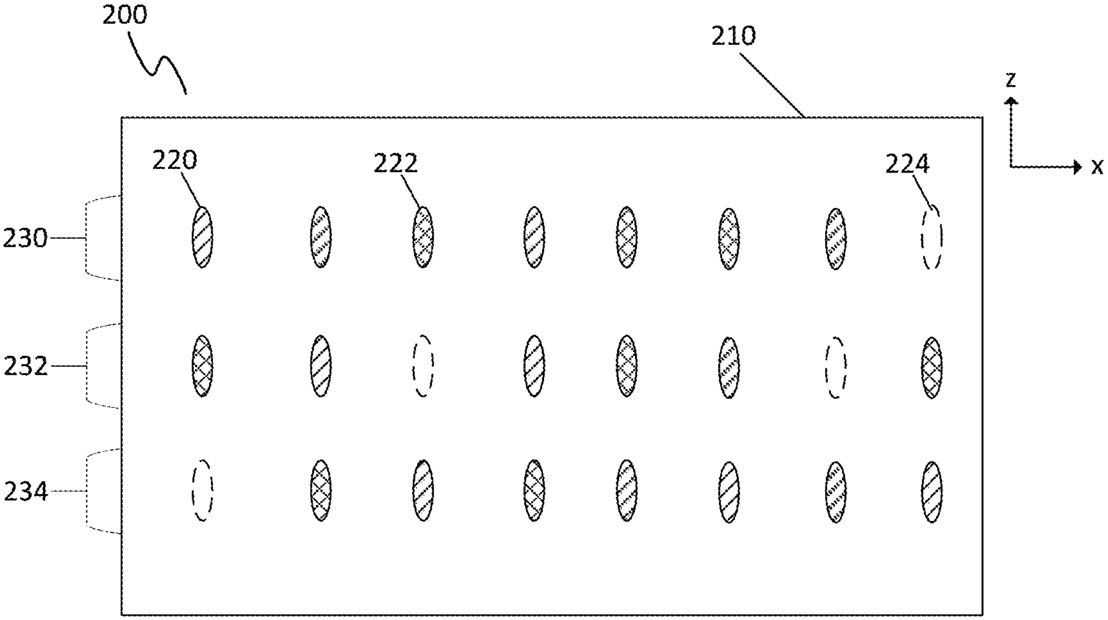
FIG. 2 is a schematic cross-section of an optical data storage medium obtainable by the method of FIG. 1.

An example optical data storage medium 200 obtainable by the method of FIG. 1 will now be described with reference to FIG. 2. FIG. 2 is a schematic cross-section of the optical data storage medium.

The data storage medium 200 comprises a transparent substrate 210. By "transparent" is meant "transparent to light at the wavelength used to write voxels to the transparent substrate".

The material of the substrate 210 is not particularly limited. Any transparent material may be used, provided that voxels may be formed in the substrate 210. For example, the substrate may comprise a glass, a glass-ceramic, or an organic polymer. In particular, the substrate may comprise glass. Examples of suitable glasses include fused quartz, borosilicate glass, and soda-lime glass. Borosilicate glass and soda-lime glass are less expensive than higher-purity glasses such as fused quartz. Glass has excellent chemical stability, and data stored as voxels in a glass substrate have an expected lifespan extending to hundreds of years or even longer under typical storage conditions. An optical data storage medium based on a borosilicate glass substrate was found to be readable even after exposure to a temperature of 380° C. for more than 8 hours.

The shape and dimensions of the substrate 210 is not particularly limited. FIG. 2 illustrates a cuboid substrate but other shapes (e.g., cylindrical) are contemplated. The substrate may have a thickness of up to 10 mm, optionally up to 5 mm, further optionally 200 μm to 2 mm.

A plurality of phase voxels 220, 222 is arranged in the substrate 210. First phase voxel 220 has a first strength, and second phase voxel 222 has a second strength, different from the first strength. In this way, the first and second phase voxels 220, 222 encode different data symbols.

The strength of a voxel is determined by its shape and refractive index. Voxels of different strengths may have different shapes and/or different refractive indices.

Considering a homogenous voxel as an example, light of wavelength λ passing through the voxel undergoes a phase change of δ radians, where δ is given by:

$$\delta = \frac{2\pi t(n_{voxel} - n_{bulk})}{\lambda}$$

where t is the thickness of the voxel (i.e., the path length of light through the voxel), $n_{voxel}$ is the refractive index of the voxel, and $n_{bulk}$ is the refractive index of the surrounding bulk medium. In this example, the strength of the voxel is the product of the voxel's thickness and the difference in refractive index between the voxel and the surrounding bulk material.

The absence of a phase voxel from a location 224 may be interpreted as a data symbol. Alternatively, all data symbols may be written to the substrate as voxels.

In the illustrated example, the voxels are arranged as a stack of layers. The stack comprises a top layer 230, an intermediate layer 232, and a bottom layer 234. In general, an optical data storage medium may comprise one or more layers of voxels.

There is no particular upper limit on the number of layers, provided that the data remains recoverable. Phase voxels cause very little light scattering, even compared to birefringent voxels. Hundreds of layers of voxels may be present, e.g. 200 to 1000 layers of voxels. The spacing between layers of voxels is not particularly limited, provided that voxels of different layers are separated from one another. The spacing may be selected as appropriate depending upon the size of the voxels. By way of illustration, adjacent layers may be spaced from one another by a distance may in the range 2 to 20 μm.

The voxels may include a fiducial mark, also referred to as a preamble.

A fiducial mark is a group of voxels arranged in a predetermined pattern. The pattern may be a two-dimensional pattern. The size of the group is not particularly limited, provided that the number of voxels is large enough to allow the pattern to be identified unambiguously when reading and decoding the optical data storage medium. By way of illustration, a 2D fiducial mark may be at least 4 voxels wide by 4 voxels high. The pattern may be repeated one or more times.

Reading data from an optical data storage medium includes capturing images of voxels embedded in the optical data storage medium. The position of a fiducial mark may be determined during image capture. The targeting of the imager may be adjusted based on the determined position.

When processing images to decode data, the fiducial mark may be identified, and positions of the voxels which form the 2D fiducial mark may be determined. Based on the determined positions, the decoding process may compensate for positional variations which occurred when writing and/or capturing images of the voxels.

For example, the positional information may be used as an input to a processing/decode method for recovering data from the optical data storage medium. The processing/decode method may comprise using a machine learning model.

The fiducial mark may have a predetermined position with respect to a sector of data-encoding voxels. The fiducial mark may, for example, be arranged along one more edges of a sector of voxels. This may allow different sectors to be distinguished from one another more easily during image capture and/or data decoding. Other arrangements are contemplated. For example, a 2D fiducial mark may alternatively or additionally be arranged at the center of a sector.

A sector is a 2-dimensional group of voxels. In many implementations, a given layer of voxels in an optical data storage medium comprises two or more sectors, and is read using a reader having a field of view sized to capture an image comprising one sector in its entirety along with edge portions of up to 8 immediately-adjacent sectors The predetermined pattern may be a Barker sequence or a Frank-Zadoff-Chu sequence. Other patterns may be used.

Symbols forming a fiducial mark may be selected so as to maximize contrast between the symbols. This may allow for easier detection of the mark.

Two or more different fiducial marks may be present in a single optical data storage medium. Adjacent sectors may be associated with different fiducial marks. This may allow the sectors to be distinguished from one another more easily.

For example, two different fiducial marks may be used, with the associated sectors being arranged in a chequerboard pattern such that no sector shares an edge with another sector having the same fiducial mark.

Writing a fiducial mark to the optical data storage medium is particularly useful when the optical data storage medium is written using a high-throughput method, such as a method as described with reference to FIG. 1. High-throughput methods can be sensitive to component drift. For example, operating a sample stage at high speed may have a trade-off in positioning accuracy.

A voxel has a position which can be described by a set of coordinates x, y, z. The positioning of voxels may be varied to encode data. This is illustrated in FIG. 3, which is a schematic plan view of an optical data storage medium 300 comprising a transparent substrate 310 having voxels 320 embedded therein.

Figure 3:
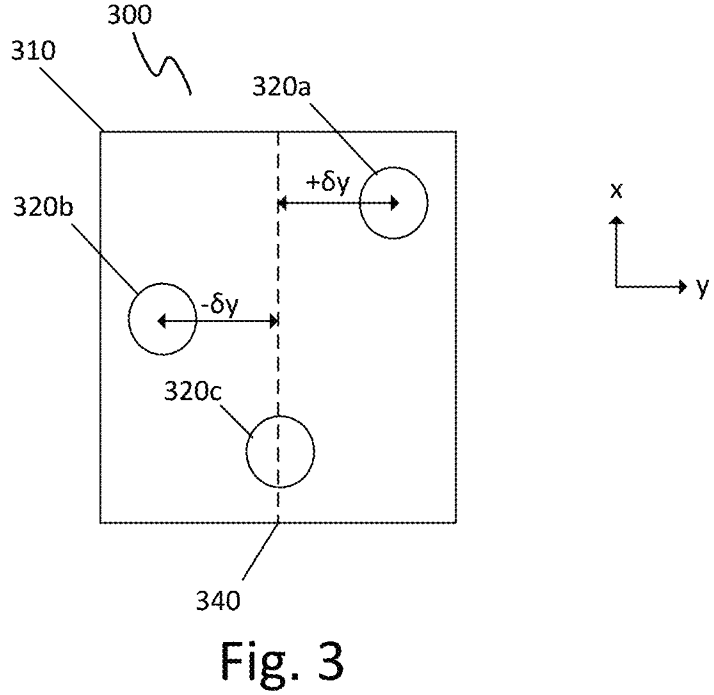
FIG. 3 is a schematic plan view of an optical data storage medium, illustrating modulation of the position of voxels.

FIG. 3 shows a row of three voxels 320*a*, 320*b*, 320*c*. An imaginary scan axis 340 corresponding to the average position of the voxels 320 in a y direction is shown.

The voxels 320 shown in FIG. 3 have equal strengths. The center of one of the voxels 320*a* is spaced from the scan axis 340 by a distance $+\delta y$. The center of another of the voxels 320*b* is spaced from the scan axis 340 a distance $-\delta y$. The last voxel 320*c* is centered on the scan axis 340.

Each of the voxels 320*a*, 320*b*, 320*c* may be taken to encode a different data symbol, based on their positions relative to the scan axis 340. In other words, position modulation may be used to encode data.

Combining phase modulation with position modulation may allow for a higher-bit encoding scheme, and hence a higher data density per unit volume.

In the example, position is modulated perpendicular to the direction of propagation of the laser pulses used to write the voxels. Position modulation within an xy plane may be easiest to implement. In principle, position in the z direction (i.e., parallel to the direction of propagation of the laser pulses) may alternatively or additionally be modulated.

FIGS. 2 and 3 illustrate voxels which are separated from each other laterally. The number of voxels per unit volume, and hence the data storage capacity per unit volume, may be increased by shingling the voxels, as will be described with reference to FIG. 4.

Figure 4:
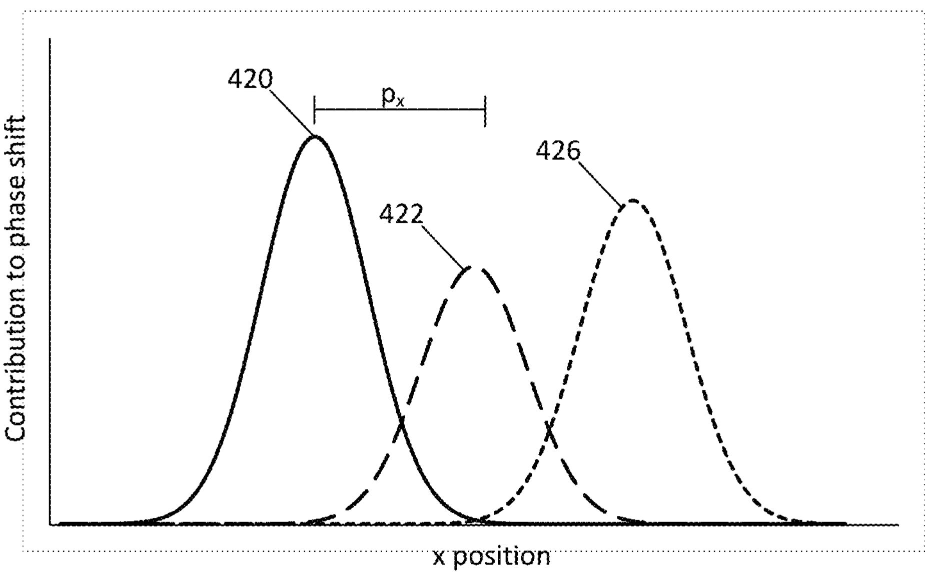
FIG. 4 is a plot showing contributions to phase shift as a function of position for three shingled voxels.

FIG. 4 shows a plot showing the magnitude of phase shifts of three voxels 420, 422, 426 as a function of position along a scan axis x. Each of the three voxels has a different peak strength.

In this example, the strength of each voxel as a function of position perpendicular to the direction of propagation of the laser pulses is inhomogeneous but radially-symmetric. More specifically, the strength follows a Gaussian distribution, centered on the focal point of the beam used to write the voxels. This is representative of voxels written using a typical laser source, since the intensity of the laser light perpendicular to the beam follows a Gaussian distribution.

Two voxels are said to be "shingled" when the voxels partially overlap, in other words, when the pitch $p_x$ between centers of adjacent voxels is non-zero but is less than the width of the voxels.

Despite the partial overlap, shingled voxels may be resolved by a reader by detecting changes in intensity of a phase shift as a function of position.

Shingling may allow a higher density of voxels per unit volume, by eliminating margins between voxels. This may in turn increase data storage capacity.

Figure 5:
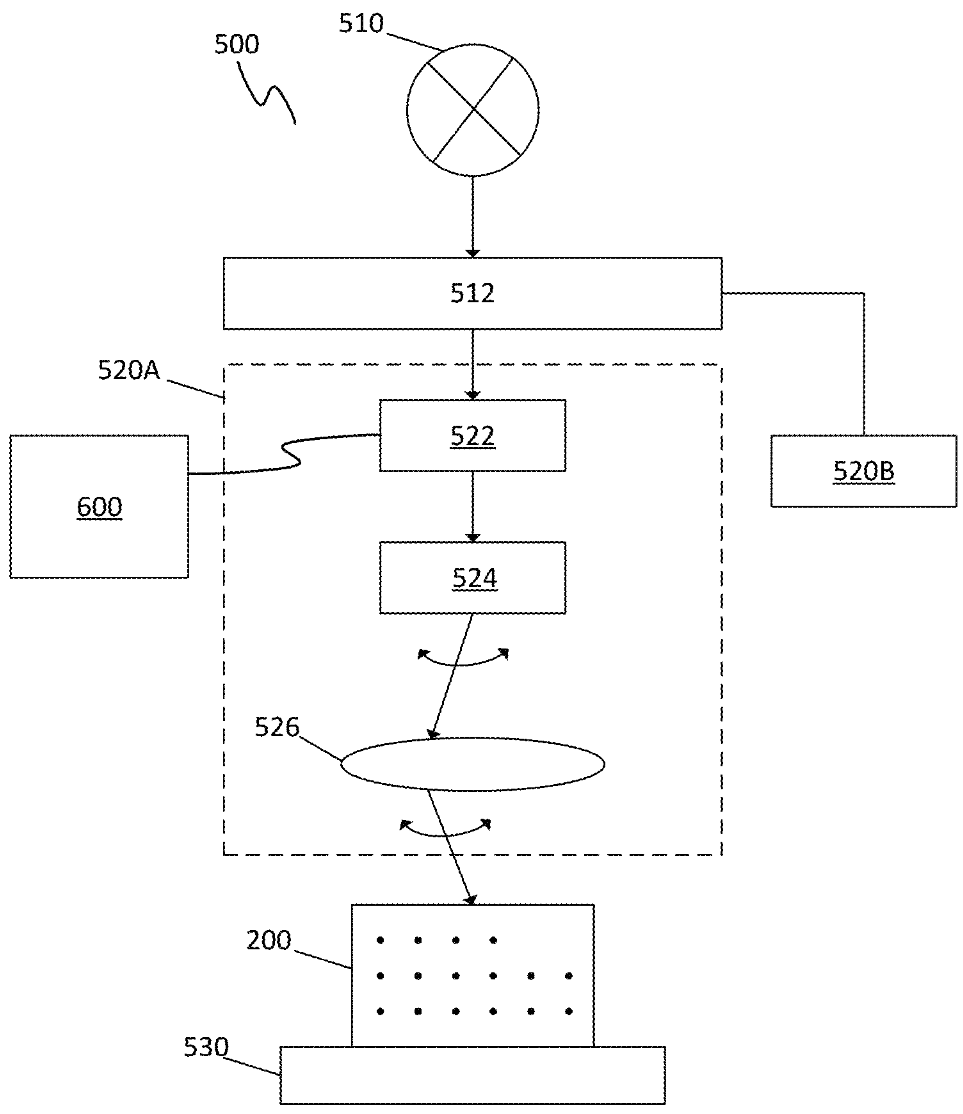
FIG. 5 is a block diagram of a system useful for writing data to a transparent substrate.
Figure 6:
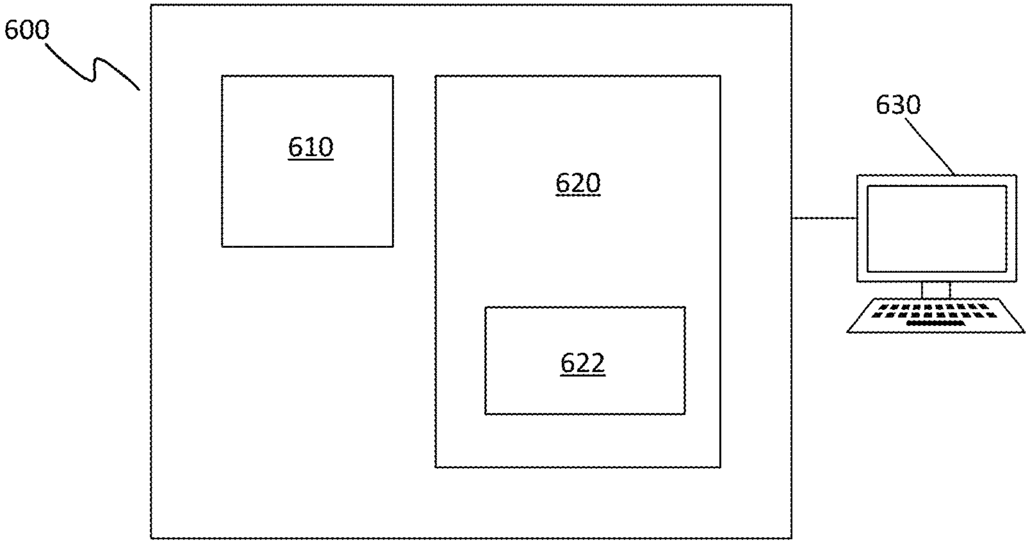
FIG. 6 is a block diagram of a controller for the system of FIG. 5.

An example system for writing data to a transparent substrate will now be described with reference to FIGS. 5 and 6. FIG. 5 is a block diagram of the system 500, and FIG. 6 is a block diagram of an example controller 600 for controlling the system 500. The system is useful for implementing a method of writing data to a transparent substrate as described herein.

System 500 includes a laser source 510, a write path 520A, and a sample stage 530 which, when in use, holds an optical data storage medium 200.

The laser source 510 generates pulses of laser light. Typically, the laser pulses are generated at a constant repetition rate with period $t_p$. By way of illustration, the repetition rate may be of the order of 10 MHz. Laser source 510 may be a femtosecond laser.

As previously described, the method provided herein may be parallelized. To this end, the example system 500 includes a beam splitter 512. Beam splitter 512 receives a laser pulse from laser source, and splits the laser pulse into two or more beams. Each beam is directed to a respective write path 520A, 520B. Each write path may implement a respective instance of the method of FIG. 1.

A write path, such as write path 520A, comprises an amplitude modulator 522, a beam scanner 524, and an objective 526.

Amplitude modulator 522 may also be referred to as a fast intensity attenuator or fast energy modulator. The amplitude modulator 522 receives an input laser pulse originating from laser source 510, and attenuates the laser pulse resulting in an attenuated laser pulse having a desired amplitude.

The amplitude modulator 522 may comprise, for example, an acousto-optic deflector, optionally in combination with a polarizer. Alternatively, the amplitude modulator may comprise the combination of an electro-optic modulator (e.g., a Pockels cell) and a polarizer.

The attenuated laser pulse from amplitude modulator 522 then arrives at scanner 524. Scanner 524 may for example comprise a spinning polygon mirror, a MEMS mirror, a Galvano scanner, an electro-optic scanner, or an acousto-optic scanner. The scanner 524 deflects the attenuated laser pulse, allowing for control over the position in the transparent substrate 200 at which the attenuated laser pulse will arrive.

For example, the scanner 524 may perform a sweep in alternating directions at a constant speed, such that a series of laser pulses forms a row of voxels in an x direction.

The write path 520A further comprises an objective 526 arranged downstream of the scanner. The objective focusses a laser pulse received from the scanner on a location in the transparent substrate 200.

The objective 526 may comprise a variable-focus lens. By varying the focus of the objective 526, the position of the voxel in the z direction may be varied.

The write path 520A may optionally include one or more further optical components. For example, the write path may include relay optics arranged between the scanner 524 and the objective 526. The relay optics may comprise a scan lens, one or more spherical lenses, and one or more tube lenses. Relay optics may alternatively be referred to as delivery optics.

The write path 520A delivers attenuated laser pulses to optical data storage medium 200, resulting in the formation of voxels in the optical data storage medium 200.

The example system 500 includes a sample stage 530 which holds the optical data storage medium. The sample stage may be configured to translate relative to the objective 526 of the write path, to allow laser pulses to be directed to different portions of the optical data storage medium.

By way of illustration, the z position of a voxel may be controlled by adjusting the focus of the objective 526; the y position of the voxel may be controlled by scanner 524; and the x position of the voxel may be controlled by moving the sample stage in the x direction.

The system 500 is configured to perform a method as described with reference to FIG. 1. To this end, the system includes a controller 600 which is operably linked to at least the amplitude modulator 522. In many implementations, controller 600 is also operably linked to at least one of, and most typically all of, laser source 510, scanner 524, and sample stage 530.

The nature of controller 600 is not particularly limited. The controller 600 may comprise dedicated hardware circuitry, programmable computer hardware, or any combination thereof.

An example implementation of a controller 600 will now be described with reference to the block diagram of FIG. 6.

The controller 600 includes a processing apparatus 610 which is operably linked to data storage 620 and an optional user terminal 630. The data storage 620 stores a computer program 622 for execution by the processing apparatus 610. When executed by the processing apparatus 610, the computer program 622 causes the controller 600 to control system 500 to perform a method as described herein.

The user terminal 630 may include user input equipment and a display device.

The user input equipment may comprise any one or more suitable input devices for known in the art for receiving inputs from a user. Examples of input devices include a pointing device, such as a mouse, stylus, joystick, touchscreen, trackpad and/or trackball. Other examples of input devices include a keyboard, a microphone when used with voice recognition algorithm, and/or a video camera when used with a gesture recognition algorithm.

Where reference is made herein to receiving an input from the user through the user input equipment, this may mean through any one or more user input devices making up the user input equipment.

The user input equipment may be useful for allowing a user to specify data to be encoded and written to an optical data storage medium and/or for allowing a user to specify parameters describing the optical data storage medium, such as identifying the nature of the transparent substrate material.

The display device may take any suitable form for outputting images, such as a light emitting diode (LED) screen, liquid crystal display (LCD), plasma screen, or cathode ray tube (CRT). The display device may comprise a touchscreen, and thus also form at least part of the user input equipment. A touchscreen may enable inputs by via being touched by the user's finger and/or using a stylus.

The inclusion of a display device is optional. A display device is useful in examples where it is desired to display human readable output to a user.

The processing apparatus 610 includes one or more processing units implemented in one or more dies, IC (integrated circuit) packages and/or housings at one or more geographic sites.

Each of the one or more processing units may take any suitable form known in the art, e.g. a general-purpose central processing unit (CPU), or a dedicated form of co-processor or accelerator processor such as a graphics processing unit (GPU), digital signal processor (DSP), etc. Each of the one or more processing units may comprise one or more cores.

Where it is said that a computer program is executed on the processing apparatus, this may mean execution by any one or more processing units making up the processing apparatus 610.

The processing apparatus 610 typically further comprises working memory, such as random-access memory and/or one or more memory caches within the one or more processing units.

The data storage 620 comprises one or more memory units implemented in one or more memory media in one or more housings at one or more geographic sites.

Each of the one or more memory units may employ any suitable storage medium known in the art, e.g. a magnetic storage medium such as a hard disk drive, magnetic tape drive etc.; or an electronic storage medium such as a solid-state drive (SSD), flash memory or electrically erasable programmable read-only memory (EEPROM), etc.; or an optical storage medium such as an optical disk drive or glass or memory crystal-based storage, etc.

Where it is said herein that some item of data is stored in data storage 610 or a region thereof, this may mean stored in any part of any one or more memory devices making up the data storage 620.

The processing apparatus 610 and data storage 620 are operably linked. The processing apparatus and data storage are configured such that processing apparatus 610 is capable of reading data from at least a portion of data storage 620, and writing data to at least a portion of the data storage 620. The processing apparatus 610 may communicate with the data storage 620 over a local connection, e.g. a physical data bus and/or via a network such as a local area network or the Internet. In the latter case the network connections may be wired or wireless.

Various modifications may be made to the example system.

In the illustrated example, light propagates between components through free space. Variants of the system may comprise a waveguide, a fiber optic cable, or the like for propagating the light.

The example system includes a beam splitter which is separate from the laser source. In variants, the laser source may be a multi-channel laser and the beam splitter may be omitted.

In still another variant, the beam may be split downstream of the amplitude modulator. A polarization modulator such as a polarizer and Pockels cell may be arranged downstream of the amplitude modulator 522. A polarization sensitive beam splitter such as a polarization grating or polarization lens may be arranged downstream of the polarization modulator. The polarization modulator and the polarization sensitive beam splitter may split a laser pulse into two pulses having different amplitudes. The two pulses may pass through the same components downstream of the polarization sensitive beam splitter. The two pulses may be focused at different positions in the medium 200 to form two phase voxels of different amplitudes simultaneously.

Parallelization of the method is optional. The system may include a single write path 520A, and beam splitter 512 may be omitted.

The example system modulates the power of the laser pulses by attenuation. Alternatively, pulses may be amplified.

Scanner 524 and objective 526 may be shared by two or more write paths.

Scanner 524 could in principle be omitted. Control over the position at which the laser pulses arrive may be achieved by moving the optical data storage medium 200 using the sample stage 530.

In the example, the sample stage translates the transparent substrate. Alternatively or additionally, the sample stage may rotate the transparent substrate.

Likewise, objective 526 may have a fixed focus, in which case the z-position of the voxel may be controlled by moving the sample stage.

In the example, the sample stage was described as movable. More generally, the system may have any configuration which allows for relative movement of the write path and optical data storage medium. The sample stage may be fixed with the other components of the system being mounted on an actuator.

Figure 7:
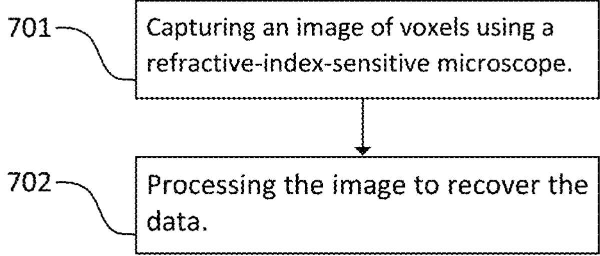
FIG. 7 is a flow diagram outlining a method of reading data from a transparent substrate obtainable by the method of FIG. 1.

A method of reading an optical data storage medium is illustrated in the flow diagram of FIG. 7.

At block 701, an image of voxels in the optical data storage medium is captured using a refractive index-sensitive microscope.

The refractive index-sensitive microscope may be a phase contrast microscope or a differential-interference microscope. When using phase contrast microscopy or differential-interference microscopy, voxels having different refractive indices are observed to have different brightnesses.

Capturing the image may comprise capturing a wide-field image. Wide-field imaging images a plurality of voxels simultaneously. Alternatively, the image may be captured using a point scanner to probe voxels one at a time.

A single image of a given layer of voxels may be captured.

In many implementations, a voxel may comprise both a region of increased refractive index and a region of decreased refractive index. These regions may be referred to as "sublayers".

Capturing the image may comprise capturing a respective image of each sublayer. The sublayer to be imaged may be selected by adjusting the focal position of the refractive index-sensitive microscope.

By capturing images of both sublayers, and then subtracting one image from the other, background noise may be reduced and/or contrast may be improved. This may allow for more reliable recovery of data.

More generally, it has been found that, adjusting focusing parameters of the microscope (for example focal position, and/or the spherical aberration correction of the objective of the microscope) may modify the contrast of the images. By capturing two or more images of a given voxel using different focusing parameters, and optionally determining differences between the images, data recovery may be made more reliable. This approach may be particularly useful for inhomogeneous voxels, but is also applicable to homogenous voxels.

After capturing the image, the image is processed at block 702 to recover the stored data. The processing of the image is a computer-implemented process.

Voxels having different strengths encode different data symbols, and have different brightnesses in the image. The data symbols are recovered based on the brightnesses of pixels in the image.

Data recovery may be implemented in various different ways. For example, the image(s) may be processed using a machine learning model. The machine learning model may comprise an artificial neural network, e.g. a convolutional neural network. The machine learning model may be trained using training data comprising images of voxels labelled with the symbols encoded by those voxels.

Example 1

Voxels were written to a borosilicate glass substrate using a method as described with reference to FIG. 1. Laser pulses having four different amplitudes were used, representing four symbols in a 2-bit encoding scheme. A single laser pulse per voxel was used.

The voxels were inhomogeneous voxels. An inhomogeneous voxel comprises a sub-layer having an increased refractive index and a sublayer having a decreased refractive index, arranged on either side of the focal point of the laser pulse used to form the voxel in the direction of propagation of the laser pulse.

Two phase contrast microscopy images of a layer of voxels were captured. The images are shown in FIGS. 8A and 8B.

Figure 8A:
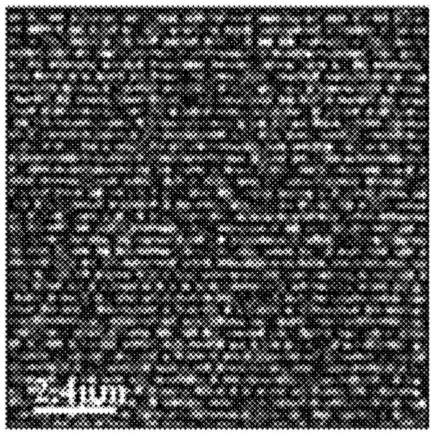
FIG. 8A is a phase contrast micrograph of a "positive" sublayer of a group of voxels.
Figure 8B:
FIG. 8B is a phase contrast micrograph of a "negative" sublayer of the group of voxels.

FIG. 8A is a "positive" image captured at a first focusing position corresponding to a first sublayer of the voxels. FIG. 8B is a "negative" image of the same voxels captured at a second focusing position corresponding to a second sublayer of the voxels.

Figure 8C:
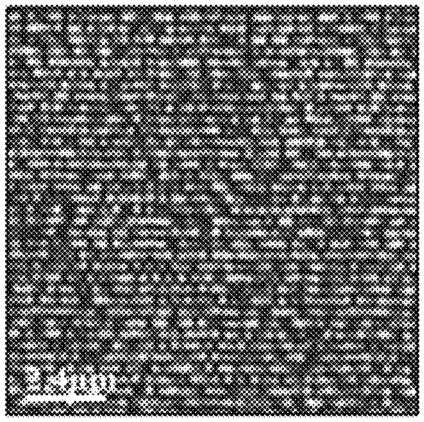
FIG. 8C is a differential image generated from the micrographs of FIGS. 8A and 8B.

A differential image was generated by subtracting the "negative" image from the "positive image". The differential image is shown in FIG. 8C. As may be seen, the differential image has a greater dynamic range. Subtracting one image from the other also removes artefacts and background effects without requiring further post-processing steps. The distance between two sublayers of a voxel is of the order of a few micrometers, and the background does not significantly change on this distance scale.

Example 2

Voxels were written to a fused silica glass substrate and a borosilicate glass substrate using a method as described with reference to FIG. 1.

Figure 9A:
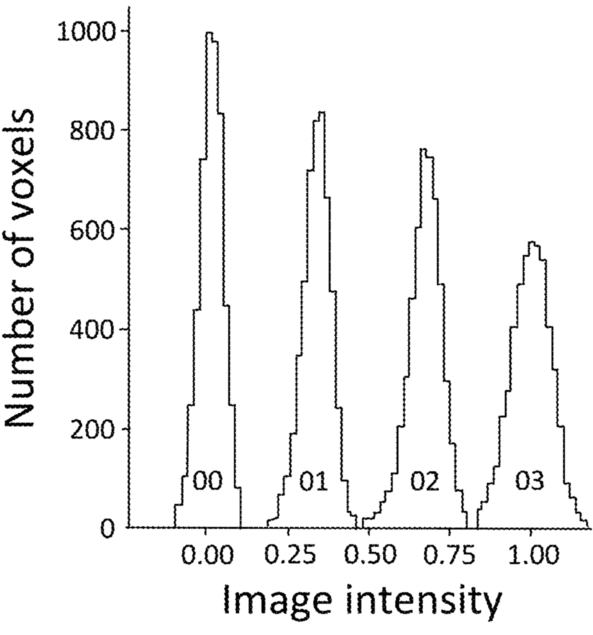
FIG. 9A is a histogram of an image of voxels written to a fused silica glass substrate.

The voxels were imaged by phase contrast microscopy. Histograms of the images are shown in FIGS. 9A and 9B, respectively.

The histograms show that the brightness measured at the locations of voxels in fused silica and borosilicate is correlated with the intended value of the symbol written to the substrate. This demonstrates that symbols can be sufficiently distinguished from one another, and that the present method is capable of multi-bit per voxel data storage.

Figure 9B:
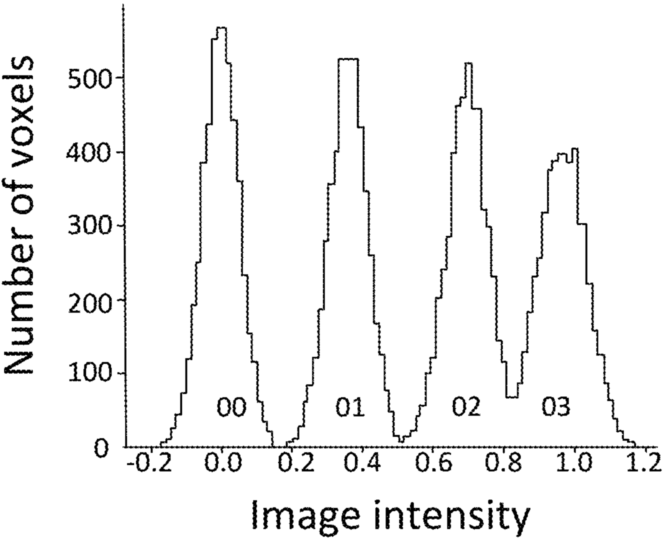
FIG. 9B is a histogram of an image of voxels written to a borosilicate glass substrate.

FIG. 9B demonstrates that symbols can be successfully written to and recovered from a borosilicate glass substrate. Borosilicate glass comprises about 80% $SiO_2$, i.e. is significantly less pure than fused silica (>99% $SiO_2$). Unlike previous methods using birefringent voxels, the present method does not necessarily require a high-purity substrate.

It will be appreciated that the above embodiments have been described by way of example only.

More generally, according to one aspect disclosed herein, there is provided a method of writing data to a transparent substrate. The method comprises forming a first voxel having a first strength by focusing a first laser pulse on a first location in a transparent substrate, and forming a second voxel having a second strength different from the first strength by focusing a second laser pulse on a second location in the transparent substrate. The second laser pulse has a second amplitude different from the first amplitude. Encoding data by amplitude modulation may allow the voxels to be written using a single laser pulse, thereby increasing data throughput. Further, voxels may be formed reliably in inexpensive substrates such as borosilicate glass.

The voxels may be referred to as "phase voxels".

Light which passes through a phase voxel undergoes a phase change. Voxels of different strengths cause phase changes of different magnitudes. Voxels of different strengths may have different refractive indices and/or different sizes.

The first location may be spaced from the second location by a distance selected such that the first voxel and the second voxel partially overlap. In other words, the first and second voxels may be shingled. Shingling allows for an increased number of voxels per unit area, thereby increasing data density.

The method may further comprise forming a third voxel by focusing a third laser pulse on a third location in the transparent substrate, the third voxel having a strength equal to the strength of the first voxel. The first voxel and the third voxel may have different shapes. Alternatively or additionally, the first voxel may be spaced from a scan axis by a first lateral spacing and the third voxel may be spaced from the scan axis by a third lateral spacing, with the first and third lateral spacings are different. Modulating the shape and/or position of voxels of equal strength may allow a higher number of bits per voxel to be encoded.

Each voxel may be formed by a single respective laser pulse. Single-pulse writing may allow for increased data throughput. Single-pulse writing may allow more efficient utilization of the laser light source.

The transparent substrate may comprise glass. The glass may be borosilicate glass or soda-lime glass. It has been found that the method provided herein may be implemented successfully using relatively low purity glass substrates. High purity glasses such as fused quartz may be used, but are not essential. The use of other substrate materials, e.g. organic polymers, is also contemplated.

The method may comprise forming at least 2 layers of voxels in the transparent substrate, optionally at least 100 layers of voxels in the transparent substrate. Phase voxels cause very little light scattering. Many layers of voxels may therefore be written to a given substrate, thereby increasing data density per unit volume.

The method may be parallelized. Two or more instances of the method may be performed simultaneously. Parallelized implementations may comprise forming at least two first voxels at respective first locations simultaneously. Parallelization may increase data throughput. Parallelization may create correlations in strength between voxels which are written simultaneously, which may aid data recovery.

The method may comprise forming a plurality of voxels arranged as a fiducial mark. The fiducial mark may be a two-dimensional fiducial mark. A fiducial mark may allow for easier recovery of data from an optical data storage medium written using the method. The targeting of an imaging system may be adjusted based on a detected fiducial mark. During a decoding process, error corrections may be applied based on the fiducial mark.

A related aspect provides an optical data storage medium, obtainable by the method. The optical data storage medium comprises a transparent substrate comprising a material having a bulk refractive index; a first voxel embedded in the transparent substrate, the first voxel having a first strength; and a second voxel embedded in the transparent substrate, the second voxel having a second strength different from the first strength, resulting in the first and second voxels encoding different data symbols. A voxel is a region of the transparent substrate having a refractive index which is different from the bulk refractive index.

The first and second voxels may be inhomogeneous voxels. An inhomogeneous voxel and comprises a positive region having a refractive index which is greater than the bulk refractive index, and a negative region having a refractive index which is less than the bulk refractive index. The positive and negative regions are arranged in series in an axial direction corresponding to the direction of propagation of the laser light used to form the voxel. When reading the voxel, the dynamic range of a reader may be increased and/or background effects may be reduced by capturing an image of the positive region, capturing an image of the negative region, and subtracting one image from the other.

The first and second voxels may be shingled. In other words, the first and second voxels may be partially overlapping. This may increase voxel density, resulting in increased data capacity.

As will be appreciated, the optical data storage medium may include features produced by any of the various optional method steps described with reference to the method aspect. For example, the optical data storage medium may comprise shape-modulated voxels and/or position-modulated voxels.

Still another aspect provides a system for writing phase voxels to a transparent substrate. The system is useful for implementing a method as described herein. The system comprises: a controller; a pulsed laser source; and a first amplitude modulator arranged downstream of the pulsed laser source on a light path. The amplitude modulator is operably linked to the controller. The controller is configured to cause the system to perform a method as provided herein.

The system may further comprise means for varying a focusing position of the intensity modulated laser pulse. The means may comprise a beam scanner, a moveable sample stage, a variable focus optic, or any combination thereof.

The system may include a write path comprising: the amplitude modulator; a scanner for varying a direction of propagation of the intensity modulated laser pulse; and an objective for receiving the intensity modulated laser pulse from the scanner and focusing the intensity modulated laser pulse on a location in the transparent substrate.

The controller may comprise one or more hardware circuits (e.g., an application-specific integrated circuit or the like) configured to implement one or more operations of the method. The controller may comprise one or more processors operably linked to a computer-readable medium, the computer-readable medium storing instructions which, when executed by the one or more processors, cause the one or more processors to control the system to implement one or more operations of the method. The controller may comprise a combination of one or more hardware circuits and one or more processors and computer-readable medium.

The system may include at least two write paths. In such implementations, the system may further comprise a beam splitter for receiving the laser pulse from the laser source and outputting respective split laser pulses to each of the write paths.

The sample stage may be operably linked to the controller and configured to translate relative to the at least one write path. This may allow for further control over the positioning of voxels in the transparent substrate.

Still another aspect provides a method of reading data from an optical data storage medium, the optical data storage medium being as defined herein. The method comprises capturing an image of the voxels using a refractive-index-sensitive microscope; and processing the image using a processor to recover the data, wherein portions of the image having different signal intensities encode different data symbols.

The refractive-index-sensitive microscope may be a phase-contrast microscope or a differential-interference-contrast microscope.

Capturing the image of the voxels may comprise capturing a first image using first focusing parameters (e.g., focusing position) and capturing a second image using second focusing parameters (e.g., focusing position) different from the first focusing parameters. Capturing multiple images may allow for more reliable data recovery. For example, contrast between voxels may vary between images.

The voxels may be inhomogeneous voxels. An inhomogeneous voxel comprises a positive sublayer having a refractive index which is greater than the bulk refractive index of the substrate, and a negative sublayer having a refractive index which is less than the bulk refractive index. In implementations where the voxels are inhomogeneous, one of the images may be an image of the positive sublayer, and the other of the images may be an image of the negative sublayer.

When two images of a voxel are captured, processing the images may further comprise subtracting the first image from the second image. This may allow for more reliable data recovery. Image contrast may be improved. Background effects may be reduced.

Processing the image may comprise processing the image using a machine learning model. The machine learning model comprises a convolutional artificial neural network. The machine learning model may be trained using images of voxels having labels representing data symbols encoded by the voxels.

In implementations where the optical data storage medium includes voxels arranged as a fiducial mark, processing the image may include determining positions of voxels in the fiducial mark.

In such implementations, the method may further comprise, based on the positions of the voxels in the fiducial mark, compensating for variations in positions of voxels in the image. Random variations in positions of voxels may occur during a writing process, and/or captured images may be subject to distortions. A fiducial mark comprises voxels arranged in a predetermined pattern. The decode process may therefore compensate for such variations and distortions based on the detected positions of voxels in the fiducial mark.

Alternatively or additionally, the method may further comprise identifying voxels as members of a sector, based on the positions of the voxels in the fiducial mark.

Also provided herein is the use of laser pulse energy modulation to encode data as voxels in a transparent substrate. The laser pulses form volumetric refractive index modifications (i.e., voxels) in the transparent substrate. Modulating the laser pulse energy may vary the volume of the voxels and/or the magnitude of the change to the refractive index of the substrate material.

Laser pulse energy modulation may be used in combination with other types of modulation, e.g. voxel shape modulation and/or modulation of voxel position with respect to a scan axis, to allow for a higher-bit encoding scheme.

Also provided herein is a method of writing data to a substrate. The method comprises:

focusing a first laser pulse having a first energy on a first region in a substrate, resulting in a first volumetric refractive index modification;

focusing a second laser pulse having a second energy on a second region in the substrate the second energy being different from the first energy resulting in a second volumetric refractive index modification having an optical property different from the first volumetric refractive index modification.

This method may include any of the various optional features described with reference to the previously-discussed method. A "voxel" may be referred to as a "volumetric refractive index modification".

A related aspect provides a transparent optical data storage medium, comprising a transparent substrate; a first volumetric refractive index modification at a first position in the transparent substrate, the first volumetric refractive index modification having a first volume and a first refractive index profile; and a second volumetric refractive index modification at a second position in the transparent substrate, the second volumetric refractive index modification having a second volume and a second refractive index profile, wherein the first refractive index profile is different from the second refractive index profile and/or the first volume is different from the second volume.

The present disclosure provides the following Clauses:

Clause 1. A method, comprising:

forming a first voxel having a first strength by focusing a first laser pulse on a first location in a transparent substrate, the first laser pulse having a first amplitude; and forming a second voxel having a second strength different from the first strength by focusing a second laser pulse on a second location in the transparent substrate, the second laser pulse having a second amplitude different from the first amplitude.

Clause 2. The method according to Clause 1, wherein the first location is spaced from the second location by a distance selected such that the first voxel and the second voxel partially overlap.

Clause 3. The method according to Clause 1 or Clause 2, further comprising forming a third voxel by focusing a third laser pulse on a third location in the transparent substrate, the third voxel having a strength equal to the strength of the first voxel.

Clause 4. The method according to Clause 3, wherein the first voxel and the third voxel have different shapes.

Clause 5. The method according to Clause 3 or Clause 4, wherein the first voxel is spaced from a scan axis by a first lateral spacing, the third voxel is spaced from the scan axis by a third lateral spacing, and the first and third lateral spacings are different.

Clause 6. The method according to any preceding Clause, wherein each voxel is formed by a single respective laser pulse.

Clause 7. The method according to any preceding Clause, wherein the transparent substrate comprises glass.

Clause 8. The method according to Clause 7, wherein the glass is borosilicate glass or soda-lime glass.

Clause 9. The method according to any preceding Clause, comprising forming at least 2 layers of voxels in the transparent substrate.

Clause 10. The method according to Clause 9, comprising forming at least 100 layers of voxels in the transparent substrate.

Clause 11. The method according to any preceding Clause, comprising forming at least two first voxels at respective first locations simultaneously.

Clause 12. The method according to any preceding Clause, comprising forming a plurality of voxels arranged as a fiducial mark.

Clause 13. An optical data storage medium, comprising:

a transparent substrate comprising a material having a bulk refractive index;

a first voxel embedded in the transparent substrate, the first voxel having a first strength; and a second voxel embedded in the transparent substrate, the second voxel having a second strength different from the first strength resulting in the first and second voxels encoding different data symbols.

Clause 14. The optical data storage medium according to Clause 13, wherein the first and second voxels are inhomogeneous voxels, and each comprise:

a positive sublayer having a refractive index which is greater than the bulk refractive index; and a negative sublayer having a refractive index which is less than the bulk refractive index.

Clause 15. The optical data storage medium according to Clause 13 or Clause 14, wherein the first and second voxels are shingled.

Clause 16. The optical data storage medium according to any of Clauses 13 to 15, which is obtainable by the method of any of Clauses 1 to 12.

Clause 17. A system comprising:

a controller;

a pulsed laser source; and a first amplitude modulator arranged downstream of the pulsed laser source on a light path;

wherein the amplitude modulator is operably linked to the controller and, in use, causes the system to perform a method comprising:

forming a first voxel having a first strength by focusing a first laser pulse on a first location in a transparent substrate, the first laser pulse having a first amplitude; and forming a second voxel having a second strength different from the first strength by focusing a second laser pulse on a second location in the transparent substrate, the second laser pulse having a second amplitude different from the first amplitude.

Clause 18. The system according to Clause 17, further comprising a scanner arranged downstream of the amplitude modulator on the light path.

Clause 19. The system according to Clause 17 or Clause 18, a beam splitter arranged between the pulsed laser source and the first amplitude modulator; and a second amplitude modulator arranged in parallel to the first amplitude modulator; wherein the second amplitude modulator is operably linked to the controller, and wherein, in use, the controller controls the system to perform a method further comprising: simultaneous to forming the first voxel, forming a third voxel by focusing a third laser pulse on a third location in the transparent substrate.

Clause 20. The system according to any of Clause 17 to 19, further comprising a movable sample stage to hold the transparent substrate.

Clause 21. A method of reading data from an optical data storage medium, the optical data storage medium being as defined in any of Clauses 13 to 16, which method comprises:

capturing an image of the voxels using a refractive-index-sensitive microscope;

processing the image using a processor to recover the data, wherein portions of the image having different signal intensities encode different data symbols.

Clause 22. The method according to Clause 21, wherein the refractive-index-sensitive microscope is a phase-contrast microscope or a differential-interference-contrast microscope.

Clause 23. The method according to Clause 21 or Clause 22, capturing the image of the voxels comprises capturing a first image using first focusing parameters and capturing a second image using second focusing parameters different from the first focusing parameters.

Clause 24. The method according to Clause 23, wherein the voxels are inhomogeneous voxels each comprising a positive sublayer having a refractive index which is greater than a bulk refractive index of the transparent substrate and a negative sublayer having a refractive index which is less than the bulk refractive index, and capturing the image comprises capturing an image of the positive sublayer and capturing an image of the negative sublayer.

Clause 25. The method according to Clause 23 or Clause 24, wherein processing the image further comprises subtracting the first image from the second image.

Clause 26. The method according to any of Clauses 21 to 25, wherein processing the image comprises processing the image using a machine learning model.

Clause 27. The method according to Clause 26, wherein the machine learning model comprises a convolutional artificial neural network.

Clause 28. The method according to any of Clauses 21 to 27, wherein the optical data storage medium includes voxels arranged as a fiducial mark, and wherein processing the image includes determining positions of the voxels arranged as the fiducial mark.

Clause 29. The method according to Clause 28, further comprising, based on the positions of the voxels in the fiducial mark, compensating for variations in positions of voxels in the image.

Clause 30. Use of laser pulse energy modulation to encode data as voxels in a transparent substrate.

Clause 31. Use according to Clause 30, further comprising use of voxel shape modulation to encode data.

Clause 32. Use according to Clause 30 or Clause 31, further comprising use of modulation of voxel position with respect to a scan axis to encode data.

Clause 33. A method, comprising:

forming a first voxel by focusing a first laser pulse on a first location in a transparent substrate; and forming a second voxel by focusing a second laser pulse on a second location in the transparent substrate;

wherein the first laser pulse and the second laser pulse have different beam shapes, resulting in the first and second voxels having different shapes.

Clause 34. The method according to Clause 33, wherein the first location is spaced from the second location by a distance selected such that the first voxel and the second voxel partially overlap.

Clause 35. The method according to Clause 33 or Clause 34, further comprising forming a third voxel by focusing a third laser pulse on a third location in the transparent substrate, the third voxel having a same shape as the first voxel.

Clause 36. The method according to Clause 35, wherein the first voxel and the third voxel have different strengths.

Clause 37. The method according to Clause 35 or Clause 36, wherein the first voxel is spaced from a scan axis by a first lateral spacing, the third voxel is spaced from the scan axis by a third lateral spacing, and the first and third lateral spacings are different.

Clause 38. The method according to any of Clauses 33 to 37, wherein each voxel is formed by a single respective laser pulse.

Clause 39. The method according to any of Clauses 33 to 38, wherein the transparent substrate comprises glass.

Clause 40. The method according to Clause 39, wherein the glass is borosilicate glass or soda-lime glass.

Clause 41. The method according to any preceding Clause, comprising forming at least 2 layers of voxels in the transparent substrate.

Clause 42. The method according to Clause 41, comprising forming at least 100 layers of voxels in the transparent substrate.

Clause 43. The method according to any of Clauses 33 to 42, comprising forming at least two first voxels at respective first locations simultaneously.

Clause 44. The method according to any of Clauses 33 to 43, comprising forming a plurality of voxels arranged as a fiducial mark.

Clause 45. An optical data storage medium, comprising:

a transparent substrate comprising a material having a bulk refractive index;

a first voxel embedded in the transparent substrate; and a second voxel embedded in the transparent substrate;

wherein a voxel is a region of the transparent substrate having a refractive index which is different from the bulk refractive index; and wherein the shape of the first voxel is different from the shape of the second voxel resulting in the first and second voxels encoding different data symbols.

Clause 46. The optical data storage medium according to Clause 45, wherein the first and second voxels are inhomogeneous voxels, and each comprise:

a positive sublayer having a refractive index which is greater than the bulk refractive index; and a negative sublayer having a refractive index which is less than the bulk refractive index.

Clause 47. The optical data storage medium according to Clause 45 or Clause 46, wherein the first and second voxels are shingled.

Clause 48. The optical data storage medium according to any of Clauses 45 to 47, which is obtainable by the method of any of Clauses 33 to 44.

Other variants or use cases of the disclosed techniques may become apparent to the person skilled in the art once given the disclosure herein. The scope of the disclosure is not limited by the described embodiments but only by the accompanying claims.

The invention claimed is:

1. A method of reading data from an optical data storage medium comprising a transparent substrate, the method comprising:

capturing an image of a sector of voxels embedded in the transparent substrate using a refractive-index-sensitive microscope, the sector of voxels comprising a 2-dimensional group of voxels, the 2-dimensional group of voxels comprising a first phase voxel having a first strength and a second phase voxel having a second strength that is different from the first strength; and recovering a first data symbol encoded by the first strength of the first phase voxel and a second data symbol encoded by the second strength of the second phase voxel based on brightnesses of pixels in the image, the second data symbol being different than the first data symbol.

2. The method according to claim 1, wherein capturing the image of the sector of voxels comprises capturing a first image using first focusing parameters and capturing a second image using second focusing parameters being different from the first focusing parameters.

3. The method according to claim 2, wherein the sector of voxels comprises inhomogeneous voxels each comprising a positive sublayer and a negative sublayer, and wherein capturing the first image comprises capturing an image of the positive sublayer, and capturing the second image comprises capturing an image of the negative sublayer.

4. The method according to claim 2, wherein recovering the first data symbol and the second data symbol comprises subtracting the first image from the second image.

5. The method according to claim 1, wherein recovering the first data symbol and the second data symbol comprises processing the image using a machine learning model, the machine learning model having been trained using images of voxels having labels representing data symbols encoded by the voxels.

6. The method according to claim 1, wherein the transparent substrate comprises voxels arranged as a fiducial mark, and wherein recovering the first data symbol and the second data symbol comprises determining positions of the voxels arranged as the fiducial mark.

7. The method according to claim 6, further comprising, based on the positions of the voxels arranged as the fiducial mark, compensating for variations in positions of the voxels in the image.

8. The method according to claim 6, further comprising identifying the sector of voxels based on the positions of the voxels arranged as the fiducial mark.

9. The method according to claim 6, further comprising adjusting targeting of the refractive-index-sensitive microscope based on the positions of the voxels arranged as the fiducial mark.

10. The method according to claim 1, wherein the sector of voxels further comprises shingled voxels, and the method further comprises detecting changes in intensity of a phase shift as a function of position to resolve the shingled voxels.

11. A system for reading a sector of voxels embedded in a transparent substrate, the system comprising:

a refractive-index-sensitive microscope; and a controller configured to capture an image of the sector of voxels embedded in the transparent substrate using the refractive-index-sensitive microscope, the sector of voxels comprising a 2-dimensional group of voxels, the 2-dimensional group of voxels comprising a first phase voxel having a first strength and a second phase voxel having a second strength that is different from the first strength, and recover a first data symbol encoded by the first strength of the first phase voxel and a second data symbol encoded by the second strength of the second phase voxel based on brightnesses of pixels in the image, the second data symbol being different than the first data symbol.

12. The system according to claim 11, wherein the refractive-index-sensitive microscope includes a phase-contrast microscope or a differential-interference-contrast microscope.

13. The system according to claim 11, wherein the controller is configured to capture the image of the sector of voxels by capturing a first image using first focusing parameters and capturing a second image using second focusing parameters being different from the first focusing parameters.

14. The system according to claim 13, wherein the sector of voxels further comprises inhomogeneous voxels each comprising a positive sublayer and a negative sublayer, and wherein the controller is configured to capture the first image by capturing an image of the positive sublayer, and to capture the second image by capturing an image of the negative sublayer.

15. The system according to claim 11, wherein the controller comprises a machine learning model that has been trained using images of voxels having labels representing data symbols encoded by the voxels, and wherein the controller is configured recover the first data symbol and the second data symbol by using the machine learning model.

16. The system according to claim 11, wherein the transparent substrate comprises voxels arranged as a fiducial mark, and wherein the controller is configured to recover the first data symbol and the second data symbol by determining positions of the voxels arranged as the fiducial mark and compensating for variations in positions of the voxels in the image.

17. A method comprising:

obtaining an image of a sector of voxels embedded in a transparent substrate captured by a refractive-index-sensitive microscope, the sector of voxels comprising a 2-dimensional group of voxels, the 2-dimensional group of voxels comprising a first phase voxel having a first strength and a second phase voxel having a second strength that is different from the first strength; and recovering a first data symbol encoded by the first strength of the first phase voxel and a second data symbol encoded by the second strength of the second phase voxel based on brightnesses of pixels in the image, the second data symbol being different than the first data symbol.

18. The method of claim 17, wherein the sector of voxels comprises inhomogeneous voxels each comprising a positive sublayer and a negative sublayer, the image is a first image of the positive sublayer, the method further comprises obtaining a second image of the negative sublayer, and wherein recovering the first data symbol and the second data symbol comprises subtracting the first image from the second image.

19. The method according to claim 17, wherein the transparent substrate comprises voxels arranged as a fiducial mark, and wherein recovering the first data symbol and the second data symbol comprises determining positions of the voxels arranged as the fiducial mark and, based on the positions of the voxels arranged as the fiducial mark, compensating for variations in positions of the voxels in the image.

20. The method according to claim 17, wherein the sector of voxels further comprises shingled voxels, and the method further comprises detecting changes in intensity of a phase shift as a function of position to resolve the shingled voxels.

* * * * *